(12) United States Patent
Zhao et al.

(10) Patent No.: US 10,820,273 B2
(45) Date of Patent: Oct. 27, 2020

(54) METHOD FOR INTERACTION BETWEEN TERMINAL AND NETWORK DEVICE, AND TERMINAL

(71) Applicant: Huawei Technologies Co., Ltd., Shenzhen (CN)

(72) Inventors: Jing Zhao, Beijing (CN); Guanghua Zhong, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 134 days.

(21) Appl. No.: 15/568,697

(22) PCT Filed: Jun. 30, 2015

(86) PCT No.: PCT/CN2015/082884
§ 371 (c)(1),
(2) Date: Oct. 23, 2017

(87) PCT Pub. No.: WO2017/000247
PCT Pub. Date: Jan. 5, 2017

(65) Prior Publication Data
US 2018/0302861 A1 Oct. 18, 2018

(51) Int. Cl.
*H04W 52/02* (2009.01)
*H04L 29/08* (2006.01)
(Continued)

(52) U.S. Cl.
CPC ......... *H04W 52/0264* (2013.01); *H04L 29/08* (2013.01); *H04L 67/14* (2013.01);
(Continued)

(58) Field of Classification Search
CPC .... H04L 29/08; H04L 67/14; H04W 52/0216; H04W 52/0264; H04W 52/0267;
(Continued)

(56) References Cited

U.S. PATENT DOCUMENTS 8,655,307 B1 * 2/2014 Walker ............. H04W 72/0493
455/405
9,785,487 B1 * 10/2017 Liu ..................... G06F 1/1632
(Continued)

FOREIGN PATENT DOCUMENTS

CN 102662474 A 9/2012
CN 103118188 A 5/2013
(Continued)

OTHER PUBLICATIONS

"Android (operating system)," Wikipedia, (Last edited on Dec. 5, 2017).
(Continued)

*Primary Examiner* — Oanh Duong
(74) *Attorney, Agent, or Firm* — Leydig, Voit & Mayer, Ltd.

(57) ABSTRACT

Embodiments of the present invention provide a method for interaction between a terminal and a network device, including: sending, by a terminal, a first heartbeat to a network device; receiving, by the terminal, a first heartbeat response returned by the network device; if a screen of the terminal is in an off state, and optionally, the off state lasts for a preset period of time, releasing network link resources of a connection between the terminal and the network device, and/or prohibiting a background application of the terminal from accessing the network device, and/or disabling a data service of the terminal; before the terminal sends a second heartbeat to the network device, restoring, by the terminal, a status of network connection to a normal connection state; sending, by the terminal, the second heartbeat to the network device; and receiving, by the terminal, a second heartbeat response returned by the network device.

16 Claims, 5 Drawing Sheets

(51) Int. Cl.
*H04W 76/25* (2018.01)
*H04M 1/725* (2006.01)
*H04W 48/06* (2009.01)

(52) U.S. Cl.
CPC ... *H04M 1/72522* (2013.01); *H04M 1/72577* (2013.01); *H04W 48/06* (2013.01); *H04W 52/0216* (2013.01); *H04W 52/0267* (2013.01); *H04W 76/25* (2018.02); *Y02D 70/00* (2018.01); *Y02D 70/1222* (2018.01); *Y02D 70/1224* (2018.01); *Y02D 70/142* (2018.01); *Y02D 70/144* (2018.01)

(58) Field of Classification Search
CPC . H04W 76/25; H04W 48/06; H04M 1/72577; H04M 1/72522; Y02D 70/00; Y02D 70/1222; Y02D 70/1224; Y02D 70/142; Y02D 70/144
See application file for complete search history.

(56) References Cited

U.S. PATENT DOCUMENTS

| | | | |
|---|---|---|---|
| 2006/0080655 A1* | 4/2006 | Prevost | G06Q 20/341 717/173 |
| 2011/0047230 A1* | 2/2011 | McGee | H04L 41/0609 709/206 |
| 2012/0030670 A1* | 2/2012 | Vijay | G06F 9/45558 718/1 |
| 2012/0188928 A1 | 7/2012 | Wang et al. | |
| 2012/0212776 A1* | 8/2012 | Murata | G06F 3/1255 358/1.15 |
| 2012/0324077 A1* | 12/2012 | Roy | G06F 1/3203 709/223 |
| 2013/0225145 A1 | 8/2013 | Cherian et al. | |
| 2013/0294307 A1 | 11/2013 | Johansson et al. | |
| 2014/0024356 A1* | 1/2014 | Yoon | G06F 3/0488 455/418 |
| 2014/0089538 A1* | 3/2014 | Bachrany | G06F 21/82 710/37 |
| 2014/0115125 A1* | 4/2014 | Chen | H04L 67/26 709/219 |
| 2014/0289403 A1* | 9/2014 | Jin | H04L 67/22 709/224 |
| 2014/0302839 A1* | 10/2014 | Deng | H04W 52/0251 455/418 |
| 2014/0321448 A1 | 10/2014 | Backholm et al. | |
| 2014/0370933 A1 | 12/2014 | Xie et al. | |
| 2014/0373095 A1 | 12/2014 | Yoon et al. | |
| 2015/0055594 A1* | 2/2015 | Nirantar | H04W 52/0251 370/329 |
| 2015/0121100 A1 | 4/2015 | Peng et al. | |
| 2017/0048333 A1 | 2/2017 | Zhong | |
| 2017/0083366 A1 | 3/2017 | Gou et al. | |
| 2017/0289075 A1* | 10/2017 | Hu | H04L 29/08 |

FOREIGN PATENT DOCUMENTS

| | | |
|---|---|---|
| CN | 103152374 A | 6/2013 |
| CN | 103209089 A | 7/2013 |
| CN | 103635881 A | 3/2014 |
| CN | 103843418 A | 6/2014 |
| CN | 104052861 A | 9/2014 |
| EP | 2698963 B1 | 2/2014 |
| EP | 2799953 A1 | 11/2014 |
| EP | 2882233 A1 | 6/2015 |
| JP | 2015502721 A | 1/2015 |
| JP | 2015513259 A | 4/2015 |
| JP | 2015525486 A | 9/2015 |
| JP | 2018520328 A | 7/2018 |
| JP | 6517370 B2 | 5/2019 |
| WO | 2015026197 A1 | 2/2015 |

OTHER PUBLICATIONS

"[v1.3] Tasker: Screen off=wifi/data off(no traffic+)AutoSync+Night/Reduce CellStandby," pp. 1-4, xdadevelopers, Retrieved from: https://web.archive.org/web/20130411183813/https://forum.xda-developers.com/showthread.php?t=2127481 (Jan. 31, 2013).

* cited by examiner

METHOD FOR INTERACTION BETWEEN TERMINAL AND NETWORK DEVICE, AND TERMINAL

CROSS-REFERENCE TO RELATED APPLICATIONS

This application is a national application stage of International Application No. PCT/CN2015/082884, filed on Jun. 30, 2015, which is hereby incorporated by reference in its entirety.

TECHNICAL FIELD

The present invention relates to the communications field, and in particular, to a method for interaction between a terminal and a network device, and a terminal.

BACKGROUND

With development of science and technology, a large quantity of terminals appear on the market and become popularized, a quantity of terminal users also increases dramatically, and a large quantity of application programs mushroom. This brings huge entertainment and high practicability to users. However, a terminal system platform such as an Android platform is an electric energy-consuming platform, charging is performed almost every day, and electric energy is insufficient for consumption of the Android platform. In addition, currently, some malicious applications also emerge increasingly, and some malicious application programs consume electric energy in the background when a user is ignorant. Even if there is no malicious application program in a terminal, when a user enables multiple application programs in the terminal, these application programs alternately interact with a network frequently, thereby consuming high electric energy. This not only causes inconvenience to user experience, but also may cause the user to miss some important issues. For example, a contract is missed because a power-consuming mobile phone is out of power when a user is away from home. Although various power banks are available currently, a power bank cannot be used on some occasions and is inconvenient to carry. Therefore, a terminal power consumption problem is not fundamentally resolved. Therefore, how to better reduce power consumption of a terminal and prolong a standby time is currently an urgent requirement of a user.

Currently, there is no effective solution to the foregoing case.

Android is a Linux-based operating system that freely uses open source code, is mainly used for mobile devices such as a smartphone and a tablet computer, and is currently developed by Google. For details, refer to https://en.wikipedia.org/wiki/Android_(operating_system). Android versions include Android 1.5, Android 2.2, Android 4.3, Android 4.4, Android 5.0, and the like.

SUMMARY

Embodiments of the present invention disclose a method for interaction between a terminal and a network device, and a terminal, to resolve an existing problem, and reduce power consumption of the terminal.

According to a first aspect, an embodiment of the present invention provides a method for interaction between a terminal and a network device, and the method includes:

sending, by a terminal, a first heartbeat to a network device;

receiving, by the terminal, a first heartbeat response returned by the network device, where the first heartbeat response is a response corresponding to the first heartbeat;

if a screen of the terminal is in an off state, and if duration of the off state is not greater than T1, releasing network link resources of a connection between the terminal and the network device; or if duration of the off state is greater than T1 and not greater than T2, where $T2>T1>0$, prohibiting a background application of the terminal from accessing the network device; or if duration of the off state is greater than T2, disabling a data service of the terminal;

before the terminal sends a second heartbeat to the network device, executing, by the terminal, the following:

if the network link resources of the connection between the terminal and the network device are released, restoring the network link resources; or if the background application of the terminal is prohibited from accessing the network device, allowing the background application of the terminal to access the network device; or if the data service of the terminal is disabled, enabling the data service of the terminal;

sending, by the terminal, the second heartbeat to the network device; and receiving, by the terminal, a second heartbeat response returned by the network device, where the second heartbeat response is a response corresponding to the second heartbeat.

With reference to the first aspect, in a first implementation manner of the first aspect, N application programs run on the terminal, N is an integer, N is greater than 1, and the first heartbeat includes a heartbeat sent by each of the N application programs to an application server corresponding to each of the N application programs.

With reference to the first implementation manner of the first aspect, in a second implementation manner of the first aspect, the N application programs send heartbeats to the network device by using a network agent in the terminal.

With reference to the first or second implementation manner of the first aspect, in a third implementation manner of the first aspect, the network device includes a network server of a terminal equipment vendor corresponding to the terminal, the first heartbeat is sent to the network server, and the network server is configured to forward the first heartbeat to application servers corresponding to the N application programs.

According to a second aspect, an embodiment of the present invention provides a method for interaction between a terminal and a network device, and the method includes:

sending, by a terminal, a first heartbeat to a network device;

receiving, by the terminal, a first heartbeat response returned by the network device, where the first heartbeat response is a response corresponding to the first heartbeat;

if a screen of the terminal is in an off state, releasing network link resources of a connection between the terminal and the network device;

before the terminal sends a second heartbeat to the network device, restoring, by the terminal, the network link resources;

sending, by the terminal, the second heartbeat to the network device; and receiving, by the terminal, a second heartbeat response returned by the network device, where the second heartbeat response is a response corresponding to the second heartbeat.

With reference to the second aspect, in a first implementation manner of the second aspect, N application programs run on the terminal, N is an integer, N is greater than 1, and the first heartbeat includes a heartbeat sent by each of the N application programs to an application server corresponding to each of the N application programs.

With reference to the first implementation manner of the second aspect, in a second implementation manner of the second aspect, the N application programs send heartbeats to the network device by using a network agent in the terminal.

With reference to the first or second implementation manner of the second aspect, in a third implementation manner of the second aspect, the network device includes a network server of a terminal equipment vendor corresponding to the terminal, the first heartbeat is sent to the network server, and the network server is configured to forward the first heartbeat to application servers corresponding to the N application programs.

According to a first aspect, an embodiment of the present invention provides a method for interaction between a terminal and a network device, and the method includes:

sending, by a terminal, a first heartbeat to a network device;

receiving, by the terminal, a first heartbeat response returned by the network device, where the first heartbeat response is a response corresponding to the first heartbeat;

if a screen of the terminal is in an off state, prohibiting a background application of the terminal from accessing the network device;

before the terminal sends a second heartbeat to the network device, allowing, by the terminal, the background application of the terminal to access the network device;

sending, by the terminal, the second heartbeat to the network device; and receiving, by the terminal, a second heartbeat response returned by the network device, where the second heartbeat response is a response corresponding to the second heartbeat.

With reference to the third aspect, in a first implementation manner of the third aspect, N application programs run on the terminal, N is an integer, N is greater than 1, and the first heartbeat includes a heartbeat sent by each of the N application programs to an application server corresponding to each of the N application programs.

With reference to the first implementation manner of the third aspect, in a second implementation manner of the third aspect, the N application programs send heartbeats to the network device by using a network agent in the terminal.

With reference to the first or second implementation manner of the third aspect, in a third implementation manner of the third aspect, the network device includes a network server of a terminal equipment vendor corresponding to the terminal, the first heartbeat is sent to the network server, and the network server is configured to forward the first heartbeat to application servers corresponding to the N application programs.

According to a fourth aspect, an embodiment of the present invention provides a method for interaction between a terminal and a network device, and the method includes:

sending, by a terminal, a first heartbeat to a network device;

receiving, by the terminal, a first heartbeat response returned by the network device, where the first heartbeat response is a response corresponding to the first heartbeat;

if a screen of the terminal is in an off state, disabling a data service of the terminal;

before the terminal sends a second heartbeat to the network device, enabling, by the terminal, the data service of the terminal;

sending, by the terminal, the second heartbeat to the network device; and receiving, by the terminal, a second heartbeat response returned by the network device, where the second heartbeat response is a response corresponding to the second heartbeat.

With reference to the fourth aspect, in a first implementation manner of the fourth aspect, N application programs run on the terminal, N is an integer, N is greater than 1, and the first heartbeat includes a heartbeat sent by each of the N application programs to an application server corresponding to each of the N application programs.

With reference to the first implementation manner of the fourth aspect, in a second implementation manner of the fourth aspect, the N application programs send heartbeats to the network device by using a network agent in the terminal.

With reference to the first or second implementation manner of the fourth aspect, in a third implementation manner of the fourth aspect, the network device includes a network server of a terminal equipment vendor corresponding to the terminal, the first heartbeat is sent to the network server, and the network server is configured to forward the first heartbeat to application servers corresponding to the N application programs.

According to a fifth aspect, an embodiment of the present invention provides a terminal that interacts with a network device, and the terminal includes:

a sending module, configured to send a first heartbeat to the network device;

a receiving module, configured to receive a first heartbeat response returned by the network device, where the first heartbeat response is a response corresponding to the first heartbeat; and a processing module, configured to: after the receiving module receives the first heartbeat response, if a screen of the terminal is in an off state, and if duration of the off state is not greater than T1, release network link resources of a connection between the terminal and the network device; or if duration of the off state is greater than T1 and not greater than T2, where T2>T1>0, prohibit a background application of the terminal from accessing the network device; or if duration of the off state is greater than T2, disable a data service of the terminal; where before the sending module sends a second heartbeat to the network device, the processing module is further configured to execute the following:

if the network link resources of the connection between the terminal and the network device are released, restoring the network link resources; or if the background application of the terminal is prohibited from accessing the network device, allowing the background application of the terminal to access the network device; or if the data service of the terminal is disabled, enabling the data service of the terminal;

the sending module is further configured to send the second heartbeat to the network device; and the receiving module is further configured to receive a second heartbeat response returned by the network device, where the second heartbeat response is a response corresponding to the second heartbeat.

With reference to the fifth aspect, in a first implementation manner of the fifth aspect, N application programs run on the processing module, N is an integer, N is greater than 1, and the first heartbeat includes a heartbeat sent by each of the N application programs to an application server corresponding to each of the N application programs.

With reference to the first implementation manner of the fifth aspect, in a second implementation manner of the fifth aspect, the N application programs send heartbeats to the network device by using a network agent in the terminal.

With reference to the first or second implementation manner of the fifth aspect, in a third implementation manner of the fifth aspect, the network device includes a network server of a terminal equipment vendor corresponding to the terminal, the first heartbeat is sent to the network server, and the network server is configured to forward the first heartbeat to application servers corresponding to the N application programs.

According to a sixth aspect, an embodiment of the present invention provides a terminal that interacts with a network device, and the terminal includes:

a sending module, configured to send a first heartbeat to the network device;

a receiving module, configured to receive a first heartbeat response returned by the network device, where the first heartbeat response is a response corresponding to the first heartbeat; and a processing module, configured to: after the receiving module receives the first heartbeat response, if a screen of the terminal is in an off state, release network link resources of a connection between the terminal and the network device; where before the sending module sends a second heartbeat to the network device, the processing module is further configured to restore the network link resources;

the sending module is further configured to send the second heartbeat to the network device; and the receiving module is further configured to receive a second heartbeat response returned by the network device, where the second heartbeat response is a response corresponding to the second heartbeat.

With reference to the sixth aspect, in a first implementation manner of the sixth aspect, N application programs run on the processing module, N is an integer, N is greater than 1, and the first heartbeat includes a heartbeat sent by each of the N application programs to an application server corresponding to each of the N application programs.

With reference to the first implementation manner of the sixth aspect, in a second implementation manner of the sixth aspect, the N application programs send heartbeats to the network device by using a network agent in the terminal.

With reference to the first or second implementation manner of the sixth aspect, in a third implementation manner of the sixth aspect, the network device includes a network server of a terminal equipment vendor corresponding to the terminal, the first heartbeat is sent to the network server, and the network server is configured to forward the first heartbeat to application servers corresponding to the N application programs.

According to a seventh aspect, an embodiment of the present invention provides a terminal that interacts with a network device, and the terminal includes:

a sending module, configured to send a first heartbeat to the network device;

a receiving module, configured to receive a first heartbeat response returned by the network device, where the first heartbeat response is a response corresponding to the first heartbeat; and a processing module, configured to: after the receiving module receives the first heartbeat response, if a screen of the terminal is in an off state, prohibit a background application of the terminal from accessing the network device; where before the sending module sends a second heartbeat to the network device, the processing module is further configured to allow the background application of the terminal to access the network device;

the sending module is further configured to send the second heartbeat to the network device; and the receiving module is further configured to receive a second heartbeat response returned by the network device, where the second heartbeat response is a response corresponding to the second heartbeat.

With reference to the seventh aspect, in a first implementation manner of the seventh aspect, N application programs run on the processing module, N is an integer, N is greater than 1, and the first heartbeat includes a heartbeat sent by each of the N application programs to an application server corresponding to each of the N application programs.

With reference to the first implementation manner of the seventh aspect, in a second implementation manner of the seventh aspect, the N application programs send heartbeats to the network device by using a network agent in the terminal.

With reference to the first or second implementation manner of the seventh aspect, in a third implementation manner of the seventh aspect, the network device includes a network server of a terminal equipment vendor corresponding to the terminal, the first heartbeat is sent to the network server, and the network server is configured to forward the first heartbeat to application servers corresponding to the N application programs.

According to an eighth aspect, an embodiment of the present invention provides a terminal that interacts with a network device, and the terminal includes:

a sending module, configured to send a first heartbeat to the network device;

a receiving module, configured to receive a first heartbeat response returned by the network device, where the first heartbeat response is a response corresponding to the first heartbeat; and a processing module, configured to: after the receiving module receives the first heartbeat response, if a screen of the terminal is in an off state, disable a data service of the terminal; where before the sending module sends a second heartbeat to the network device, the processing module is further configured to enable the data service of the terminal;

the sending module is further configured to send the second heartbeat to the network device; and the receiving module is further configured to receive a second heartbeat response returned by the network device, where the second heartbeat response is a response corresponding to the second heartbeat.

With reference to the eighth aspect, in a first implementation manner of the eighth aspect, N application programs run on the processing module, N is an integer, N is greater than 1, and the first heartbeat includes a heartbeat sent by each of the N application programs to an application server corresponding to each of the N application programs.

With reference to the first implementation manner of the eighth aspect, in a second implementation manner of the eighth aspect, the N application programs send heartbeats to the network device by using a network agent in the terminal.

With reference to the first or second implementation manner of the eighth aspect, in a third implementation manner of the eighth aspect, the network device includes a network server of a terminal equipment vendor corresponding to the terminal, the first heartbeat is sent to the network server, and the network server is configured to forward the first heartbeat to application servers corresponding to the N application programs.

According to a ninth aspect, an embodiment of the present invention provides a terminal, and the terminal includes:

a transceiver, configured to send and receive data exchanged between the terminal and a network device;

one or more processors;

a memory;

multiple application programs; and one or more programs, where the one or more programs are stored in the memory and are configured to be executed by the one or more processors, the one or more programs include an instruction, and the instruction is used for:

sending, by the terminal, a first heartbeat to the network device;

receiving, by the terminal, a first heartbeat response returned by the network device, where the first heartbeat response is a response corresponding to the first heartbeat;

if a screen of the terminal is in an off state, and if duration of the off state is not greater than T1, releasing network link resources of a connection between the terminal and the network device; or if duration of the off state is greater than T1 and not greater than T2, where T2>T1>0, prohibiting a background application of the terminal from accessing the network device; or if duration of the off state is greater than T2, disabling a data service of the terminal;

before the terminal sends a second heartbeat to the network device, executing, by the terminal, the following:

if the network link resources of the connection between the terminal and the network device are released, restoring the network link resources; or if the background application of the terminal is prohibited from accessing the network device, allowing the background application of the terminal to access the network device; or if the data service of the terminal is disabled, enabling the data service of the terminal;

sending, by the terminal, the second heartbeat to the network device; and receiving, by the terminal, a second heartbeat response returned by the network device, where the second heartbeat response is a response corresponding to the second heartbeat.

With reference to the ninth aspect, in a first implementation manner of the ninth aspect, N application programs run on the processor, N is an integer, N is greater than 1, and the first heartbeat includes a heartbeat sent by each of the N application programs to an application server corresponding to each of the N application programs.

With reference to the first implementation manner of the ninth aspect, in a second implementation manner of the ninth aspect, the N application programs send heartbeats to the network device by using a network agent in the terminal.

With reference to the first or second implementation manner of the ninth aspect, in a third implementation manner of the ninth aspect, the network device includes a network server of a terminal equipment vendor corresponding to the terminal, the first heartbeat is sent to the network server, and the network server is configured to forward the first heartbeat to application servers corresponding to the N application programs.

According to a tenth aspect, an embodiment of the present invention provides a terminal, and the terminal includes:

a transceiver, configured to send and receive data exchanged between the terminal and a network device;

one or more processors;

a memory;

multiple application programs; and one or more programs, where the one or more programs are stored in the memory and are configured to be executed by the one or more processors, the one or more programs include an instruction, and the instruction is used for:

sending, by the terminal, a first heartbeat to the network device;

receiving, by the terminal, a first heartbeat response returned by the network device, where the first heartbeat response is a response corresponding to the first heartbeat;

if a screen of the terminal is in an off state, releasing network link resources of a connection between the terminal and the network device;

before the terminal sends a second heartbeat to the network device, restoring, by the terminal, the network link resources; and receiving, by the terminal, a second heartbeat response returned by the network device, where the second heartbeat response is a response corresponding to the second heartbeat.

With reference to the tenth aspect, in a first implementation manner of the tenth aspect, N application programs run on the processor, N is an integer, N is greater than 1, and the first heartbeat includes a heartbeat sent by each of the N application programs to an application server corresponding to each of the N application programs.

With reference to the first implementation manner of the tenth aspect, in a second implementation manner of the tenth aspect, the N application programs send heartbeats to the network device by using a network agent in the terminal.

With reference to the first or second implementation manner of the tenth aspect, in a third implementation manner of the tenth aspect, the network device includes a network server of a terminal equipment vendor corresponding to the terminal, the first heartbeat is sent to the network server, and the network server is configured to forward the first heartbeat to application servers corresponding to the N application programs.

According to an eleventh aspect, an embodiment of the present invention provides a terminal, and the terminal includes:

a transceiver, configured to send and receive data exchanged between the terminal and a network device;

one or more processors;

a memory;

multiple application programs; and one or more programs, where the one or more programs are stored in the memory and are configured to be executed by the one or more processors, the one or more programs include an instruction, and the instruction is used for:

sending, by the terminal, a first heartbeat to the network device;

receiving, by the terminal, a first heartbeat response returned by the network device, where the first heartbeat response is a response corresponding to the first heartbeat;

if a screen of the terminal is in an off state, prohibiting a background application of the terminal from accessing the network device;

before the terminal sends a second heartbeat to the network device, allowing, by the terminal, the background application of the terminal to access the network device; and receiving, by the terminal, a second heartbeat response returned by the network device, where the second heartbeat response is a response corresponding to the second heartbeat.

With reference to the eleventh aspect, in a first implementation manner of the eleventh aspect, N application programs run on the processor, N is an integer, N is greater than 1, and the first heartbeat includes a heartbeat sent by each of the N application programs to an application server corresponding to each of the N application programs.

With reference to the first implementation manner of the eleventh aspect, in a second implementation manner of the eleventh aspect, the N application programs send heartbeats to the network device by using a network agent in the terminal.

With reference to the first or second implementation manner of the eleventh aspect, in a third implementation manner of the eleventh aspect, the network device includes a network server of a terminal equipment vendor corresponding to the terminal, the first heartbeat is sent to the network server, and the network server is configured to forward the first heartbeat to application servers corresponding to the N application programs.

According to a twelfth aspect, an embodiment of the present invention provides a terminal, and the terminal includes:

a transceiver, configured to send and receive data exchanged between the terminal and a network device;

one or more processors;

a memory;

multiple application programs; and one or more programs, where the one or more programs are stored in the memory and are configured to be executed by the one or more processors, the one or more programs include an instruction, and the instruction is used for:

sending, by the terminal, a first heartbeat to the network device;

receiving, by the terminal, a first heartbeat response returned by the network device, where the first heartbeat response is a response corresponding to the first heartbeat;

if a screen of the terminal is in an off state, disabling a data service of the terminal;

before the terminal sends a second heartbeat to the network device, enabling, by the terminal, the data service of the terminal;

sending, by the terminal, the second heartbeat to the network device; and receiving, by the terminal, a second heartbeat response returned by the network device, where the second heartbeat response is a response corresponding to the second heartbeat.

With reference to the twelfth aspect, in a first implementation manner of the twelfth aspect, N application programs run on the processor, N is an integer, N is greater than 1, and the first heartbeat includes a heartbeat sent by each of the N application programs to an application server corresponding to each of the N application programs.

With reference to the first implementation manner of the twelfth aspect, in a second implementation manner of the twelfth aspect, the N application programs send heartbeats to the network device by using a network agent in the terminal.

With reference to the first or second implementation manner of the twelfth aspect, in a third implementation manner of the twelfth aspect, the network device includes a network server of a terminal equipment vendor corresponding to the terminal, the first heartbeat is sent to the network server, and the network server is configured to forward the first heartbeat to application servers corresponding to the N application programs.

According to a thirteenth aspect, an embodiment of the present invention provides a method for interaction between a terminal and a network device, and the method includes:

obtaining, by a terminal, a status of a screen of the terminal; and if the screen of the terminal is in an off state, and if duration of the off state is not greater than T1, releasing network link resources of a connection between the terminal and the network device; or if duration of the off state is greater than T1 and not greater than T2, where T2>T1>0, prohibiting a background application of the terminal from accessing the network device; or if duration of the off state is greater than T2, disabling a data service of the terminal.

According to a fourteenth aspect, an embodiment of the present invention provides a terminal that interacts with a network device, and the terminal includes:

a processing module, configured to obtain a status of a screen of the terminal; and the processing module is further configured to: if the screen of the terminal is in an off state, and if duration of the off state is not greater than T1, release network link resources of a connection between the terminal and the network device; or if duration of the off state is greater than T1 and not greater than T2, where T2>T1>0, prohibit a background application of the terminal from accessing the network device; or if duration of the off state is greater than T2, disable a data service of the terminal.

According to a fifteenth aspect, an embodiment of the present invention provides a terminal, and the terminal includes:

a transceiver, configured to send and receive data exchanged between the terminal and a network device;

one or more processors;

a memory;

multiple application programs; and one or more programs, where the one or more programs are stored in the memory and are configured to be executed by the one or more processors, the one or more programs include an instruction, and the instruction is used for:

sending, by the terminal, a first heartbeat to the network device;

receiving, by the terminal, a first heartbeat response returned by the network device, where the first heartbeat response is a response corresponding to the first heartbeat;

if a screen of the terminal is in an off state, prohibiting a background application of the terminal from accessing the network device;

before the terminal sends a second heartbeat to the network device, allowing, by the terminal, the background application of the terminal to access the network device; and receiving, by the terminal, a second heartbeat response returned by the network device, where the second heartbeat response is a response corresponding to the second heartbeat.

In the solutions provided in the embodiments of the present invention, after a terminal receives a heartbeat response, if a screen is in an off state, and optionally, the off state lasts for a preset period of time, the terminal may release network link resources of a connection between the terminal and the network device, and/or prohibit a background application of the terminal from accessing the network device, and/or disable a data service of the terminal, and restore a status of network connection to a normal connection state before sending a heartbeat again. In this way, when the screen is off between two heartbeats, and optionally, the off state lasts for a preset period of time, data exchange between an application program and the network device is interrupted, so that power consumption of the terminal can be effectively reduced when both the terminal and an application server to which the application program belongs are online and a user is unaware.

BRIEF DESCRIPTION OF DRAWINGS

To describe the technical solutions in the embodiments of the present invention more clearly, the following briefly introduces the accompanying drawings required for describing the prior art or the embodiments. Apparently, the accompanying drawings in the following description show merely some embodiments of the present invention, and a person skilled in the art may still derive other drawings from these accompanying drawings.

DESCRIPTION OF EMBODIMENTS

To make the objectives, technical solutions, and advantages of the present invention clearer, the following further describes the embodiments of the present invention in detail with reference to the accompanying drawings. To understand the present invention, the following description mentions many specific details. However, a person skilled in the art should understand that the present invention may be implemented without these specific details. In other embodiments, well-known methods, processes, components, and circuits are not described in detail, so as to prevent the embodiments from being blurred. Apparently, the described embodiments are some rather than all of the embodiments of the present invention. All other embodiments obtained by a person of ordinary skill in the art based on the embodiments of the present invention without creative efforts shall fall within the protection scope of the present invention.

The terms used in the embodiments of the present invention are merely for the purpose of illustrating specific embodiments, and are not intended to limit the present invention. The terms "a", "said", and "the" of singular forms used in the embodiments and the appended claims of the present invention are also intended to include plural forms, unless otherwise specified in the context clearly. It should also be understood that, the term "and/or" used herein indicates and includes any or all possible combinations of one or more associated listed items. It should be further understood that the term "include" used in the specification specifies presence of features, integers, steps, operations, elements, and/or components, with presence or attachment of other features, integers, steps, operations, components, elements, and their combinations not excluded.

Figure 1:
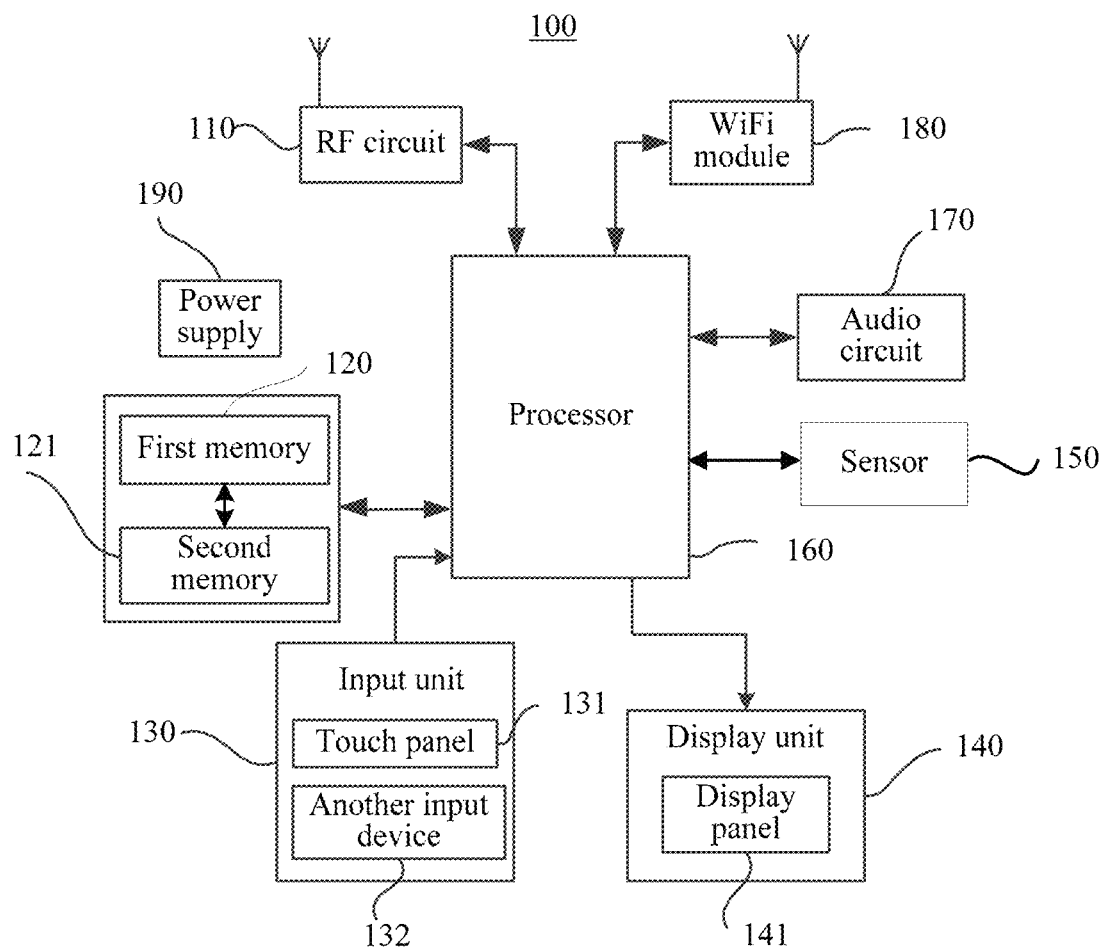
FIG. 1 is a structural block diagram of a mobile phone according to an embodiment of the present invention.

A terminal involved in the embodiments of the present invention may be a terminal device such as a mobile phone, a tablet computer, a personal digital assistant (Personal Digital Assistant, PDA for short), a point of sales terminal (Point of Sales, POS for short), or a vehicle-mounted computer. This is not specifically limited in the embodiments of the present invention. In an example, the terminal is a mobile phone. FIG. 1 shows a block diagram of a partial structure of a mobile phone 100 related to a terminal according to an embodiment of the present invention.

Referring to FIG. 1, the mobile phone 100 includes components such as a radio frequency (Radio Frequency, RF for short) circuit 110, a memory 120, an input unit 130, a display unit 140, a sensor 150, an audio circuit 170, a wireless fidelity (wireless fidelity, WiFi for short) module 180, a processor 160, and a power supply 190. A person skilled in the art may understand that a structure of the mobile phone shown in FIG. 1 is used only as an example of implementation manners and does not constitute a limitation on the mobile phone, and the mobile phone may include more or fewer components than those shown in the figure, or some components may be combined, or components may be deployed differently.

The components of the mobile phone 100 are specifically described below with reference to FIG. 1.

The RF circuit 110 may be configured to receive and send signals in an information receiving and sending process or a call process. Particularly, the RF circuit 110 receives downlink information from a base station, then sends the downlink information to the processor 160 for processing, and sends related uplink data to the base station. Generally, the RF circuit includes but is not limited to an antenna, at least one amplifier, a transceiver, a coupler, a low noise amplifier (Low Noise Amplifier, LNA for short), a duplexer, and the like. In addition, the RF circuit 110 may further communicate with a network and another device by means of wireless communication. Any communications standard or protocol may be used for the wireless communication and includes but is not limited to Global System for Mobile Communications (Global System of Mobile communication, GSM for short), General Packet Radio Service (General Packet Radio Service, GPRS for short), Code Division Multiple Access (Code Division Multiple Access, CDMA for short), Wideband Code Division Multiple Access (Wideband Code Division Multiple Access, WCDMA for short), and the like.

The memory 120 may be configured to store a software program and a module. The processor 160 runs the software program and the module stored in the memory 120, to implement various functional applications and data processing of the mobile phone 100. The memory 120 may mainly include a program storage area and a data storage area. The program storage area may store an operating system, an application program required by at least one function (such as a sound playback function or an image display function), and the like, and the data storage area may store data (such as audio data and a phone book) created according to use of the mobile phone 100, and the like. In addition, the memory 120 may include a high-speed random access memory, and may also include a non-volatile memory such as at least one disk storage component, a flash memory component, or another volatile solid-state storage component. The memory 120 in FIG. 1 may refer to all memories of the mobile phone 100, or the memory 120 may refer to a first memory of the mobile phone 100. The mobile phone 100 further includes a second memory 121, or the mobile phone 100 further includes another memory that is not shown.

The input unit 130 may be configured to: receive entered digital or character information, and generate key signal input related to a user setting and function control of the mobile phone 100. Specifically, the input unit 130 may include a touch panel 131 and another input device 132. The touch panel 131, also referred to as a touchscreen, may collect a touch operation of a user on or near the touch panel 131 (such as an operation of the user on or near the touch panel 131 by using any suitable object or attachment, such as a finger or a touch pen), and drive a corresponding connection apparatus according to a preset program. Optionally, the touch panel 131 may include two parts: a touch detection apparatus and a touch controller. The touch detection apparatus detects a touch orientation of the user, detects a signal generated by the touch operation, and transfers the signal to the touch controller. The touch controller receives touch information from the touch detection apparatus, converts the touch information into contact coordinates, then sends the contact coordinates to the processor 160, and can receive and execute a command sent by the processor 160. In addition, the touch panel 131 may be implemented in multiple types such as a resistive type, a capacitive type, an infrared type, and a surface acoustic wave type. In addition to the touch panel 131, the input unit 130 may include the another input device 132. Specifically, the another input device 132 may include but be not limited to one or more of a physical keyboard, a functional key (such as a volume control key or an on/off key), a trackball, a mouse, or a joystick.

The display unit 140 may be configured to display information entered by the user or information provided for the user, and various menus of the mobile phone 100. The display unit 140 may include a display panel 141, and optionally, the display panel 141 may be configured by using a liquid crystal display (Liquid Crystal Display, LCD for short), an organic light-emitting diode (Organic Light-Emitting Diode, OLED for short), and the like. Further, the touch panel 131 may cover the display panel 141. After detecting a touch operation on or near the touch panel 131, the touch panel 131 transfers the touch operation to the processor 160, so as to determine a type of a touch event. Then, the processor 160 provides corresponding visual output on the display panel 141 according to the type of the touch event. Although in FIG. 14, the touch panel 131 and the display panel 141 are used as two separate components to implement input and output functions of the mobile phone 100, in some embodiments, the touch panel 131 and the display panel 141 may be integrated to implement the input and output functions of the mobile phone 100.

The mobile phone 100 may further include at least one sensor 150 such as an optical sensor, a motion sensor, or another sensor. Specifically, the optical sensor may include an ambient light sensor and a proximity sensor. The ambient light sensor may adjust luminance of the display panel 141 according to brightness of ambient light. The proximity sensor may switch off the display panel 141 and/or backlight when the mobile phone 100 is moved to an ear. As a type of motion sensor, an accelerometer sensor can detect magnitudes of accelerations in various directions (generally on three axes), can detect a magnitude and a direction of gravity at rest, and may be applied to an application that recognizes a mobile phone gesture (for example, screen switching between a landscape mode and a portrait mode, a related game, and magnetometer gesture calibration), a function related to vibration recognition (such as a pedometer or a knock), and the like. For other sensors such as a gyroscope, a barometer, a hygrometer, a thermometer, and an infrared sensor that may be further configured for the mobile phone 100, details are not described herein.

The audio circuit 170 may include a loudspeaker and a microphone, and the microphone can provide an audio interface between the user and the mobile phone 100. The audio circuit 170 may convert received audio data into an electric signal and transmit the electric signal to the loudspeaker. The loudspeaker converts the electric signal into a sound signal for output. In another aspect, the microphone converts a collected sound signal into an electric signal. The audio circuit 170 receives the electric signal, converts the electric signal into audio data, and then outputs the audio data to the processor 160 for processing. Then, the processor 160 sends the audio data to, for example, another mobile phone by using the RF circuit 110, or outputs the audio data to the memory 120 for further processing.

WiFi is a short-range wireless transmission technology. The mobile phone 100 may help, by using the WiFi module 180, the user receive and send e-mails, browse a webpage, access streaming media, and the like. WiFi provides wireless broadband Internet access for the user. Although FIG. 14 shows the WiFi module 180, it may be understood that the WiFi module 180 is not a necessary component of the mobile phone 100, and the WiFi module 180 may be omitted according to a requirement provided that the essence of the present invention is not changed.

The processor 160 is a control center of the mobile phone 100, is connected to various parts of the entire mobile phone 100 by using various interfaces and lines, and performs various functions and data processing of the mobile phone 100 by running or executing the software program and/or the module stored in the memory 120 and invoking the data stored in the memory 120, so as to perform overall monitoring on the mobile phone. Optionally, the processor 160 may include one or more processing units. Optionally, an application processor (Application Processor, AP) and a communication processor (Communication Processor, CP) may be integrated into the processor 160. The application processor mainly processes an operating system, a user interface, an application program, and the like. The communication processor may also be referred to as a baseband processor (Baseband Processor, BP), and mainly processes wireless communication, for example, is responsible for managing all radio frequency services that need an antenna. It may be understood that, the communication processor may not be integrated into the processor 160. The communication processor may include a modulator-demodulator (modulator-demodulator, modem) module, an encoding and decoding module, a scrambling module, an interleaving module, and the like. According to different actual requirements of a terminal, the communication processor may include different functional modules. For example, different communication processor chips are used for different terminals.

The mobile phone 100 further includes the power supply 190 (such as a battery) for supplying power to the components. Preferably, the power supply may be logically connected to the processor 160 by using a power management system, thereby implementing functions such as charging, discharging, and power consumption management by using the power management system.

The mobile phone 100 may further include a camera, a Bluetooth module, and the like although they are not shown in the figure, and details are not described herein.

Heartbeat Mechanism

To keep a terminal and a corresponding server to which an application program belongs online, the application program needs to send a heartbeat to the application server at a specific interval, and after receiving the heartbeat, the application server returns a heartbeat response to the application program. The heartbeat may also be referred to as a heartbeat frame or a heartbeat packet.

If the application program does not receive, within a specified period of time, the heartbeat response returned by the application server, the application program considers that a network link is disconnected or an error occurs in the application server, and performs connection and login again. If the application server does not receive, within a specified period of time, the heartbeat sent by the application program, the application server releases a server resource, and cancels an online state of the application program.

Figure 2:
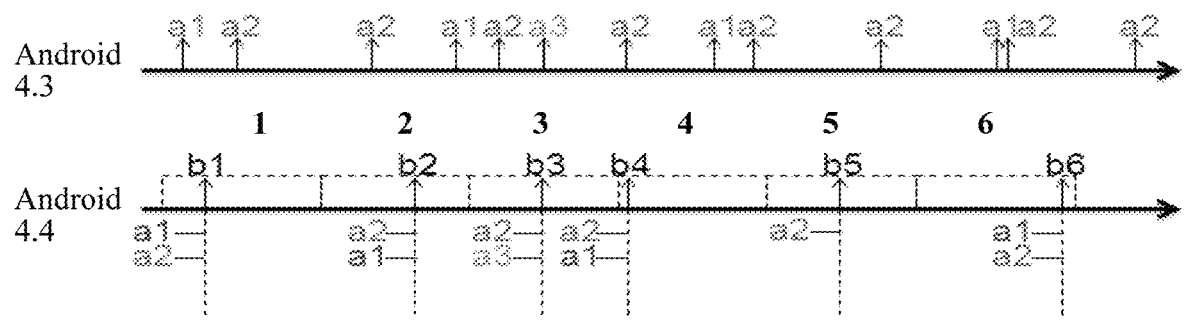
FIG. 2 is a schematic diagram of a heartbeat mechanism applied to Android 4.3 and Android 4.4 systems according to an embodiment of the present invention.

In the Android 4.3 system, as shown in FIG. 2, application programs running on a terminal include application programs a1, a2, and a3. The application programs a1, a2, and a3 separately send heartbeats to application servers at different intervals. Each application program running on the terminal sends a heartbeat to an application server at an interval in the foregoing heartbeat sending manner, to keep the application program online. Each time each running application program sends a heartbeat, the terminal needs to request a data transmission connection from a network device of a mobile network, and exchange a heartbeat and a heartbeat response with the application server by means of the data transmission connection.

However, each time the terminal establishes a data transmission connection to the network device of the mobile network, the terminal needs to occupy a signaling resource of a control layer of the mobile network. For example, in a packet domain network architecture, the terminal needs to activate the Packet Data Protocol (Packet Data Protocol, PDP) on one side by means of signaling interaction with the network device of the mobile network, the network device assigns an IP address to the terminal, and then, the terminal uses the IP address to perform data transmission with a network communications peer device in a data network. Therefore, frequent transmission of heartbeat messages occupies a large quantity of signaling resources of the control layer of the mobile network, and when multiple application programs in the terminal are online, this case is severer, thereby affecting normal running of another service, and reducing network service quality of the mobile network.

The Android 4.4 system is obtained by optimizing the Android 4.3 system, and performs combination and batch processing on some heartbeats of applications running on a terminal, as shown in FIG. 2. The terminal includes running application programs a1, a2, and a3. The application programs a1, a2, and a3 separately send heartbeats to application servers at different intervals. The Android 4.4 system performs batch processing on heartbeats whose sending times are adjacent and close to each other. For example, in the first part, times at which the terminal sends heartbeats of a1 and a2 are adjacent and close to each other, and combination processing may be performed on the sending of the two heartbeats. For example, one time point is selected from the sending times of the heartbeats of a1 and a2 to send a heartbeat b1. The heartbeat b1 includes the heartbeats of the applications a1 and a2. It may be understood that, performing combination processing on the sending of the two heartbeats herein may be combining the heartbeats of a1 and a2 for sending, or may be sending the heartbeats of a1 and a2 successively at the sending time points. In other words, the heartbeat b1 may be two heartbeats, and is a collective term for the heartbeats of a1 and a2; or the heartbeat b1 may be one heartbeat into which the heartbeats of a1 and a2 are combined. If the heartbeats of a1 and a2 are combined into the heartbeat b1, a network device needs to separately forward the heartbeats of a1 and a2 to corresponding application servers. In the second part, times at which the terminal sends heartbeats of a2 and a1 are adjacent and close to each other, and combination processing may be performed on the sending of the two heartbeats. One time point is selected from the sending times of the heartbeats of a2 and a1 to send a heartbeat b2. The heartbeat b2 includes the heartbeats of the applications a2 and a1. In the third part, times at which the terminal sends heartbeats of a2 and a3 are adjacent and close to each other, and combination processing is performed on the sending of the two heartbeats. One time point may be selected from the sending times of the heartbeats of a2 and a3 to send a heartbeat b3. The heartbeat b3 includes the heartbeats of the applications a2 and a3. The rest can be deduced by analogy.

Although the Android 4.4 system performs batch processing on running heartbeats, it may be seen that, after the batch processing, an interval at which heartbeats are sent is still short, and activities are frequent. Consequently, overall power consumption of the terminal is still large Unifying heartbeats refers to unifying multiple application programs running on a terminal, to send heartbeats simultaneously or successively at one determined interval. When a unified heartbeat interval arrives, the terminal establishes a data transmission connection to a network device, and sends heartbeats corresponding to the multiple application programs to corresponding application servers by means of the established data transmission connection. The unified heartbeat interval of the terminal is a heartbeat sending interval that makes application programs currently running on the terminal and corresponding application servers online. When the network connection is unblocked, if the terminal sends the heartbeats of the multiple running application programs and receives heartbeat responses of the application servers at the unified heartbeat interval, the application programs and the corresponding application servers always remain online, and no new connection needs to be established for interaction between the application programs and the corresponding application servers. It may be understood that, the unified heartbeat interval is related to an application program currently running on the terminal. When an application program is enabled or an application program is disabled, the unified heartbeat interval may change.

An Android platform allows a process to run in the background, such as a message push or network data synchronization. Consequently, when a screen is off and a terminal enters a standby state, network resources are frequently occupied, and standby power consumption is relatively large. A main reason is that after the screen is off, applications still access a network by using data services. To resolve a problem that the power consumption is excessively large when the screen is off, some vendors directly disable a data service when the screen is off for over 30 minutes or over one hour, to reduce the power consumption. However, within a time shorter than one hour or 30 minutes, the standby power consumption is still large. According to current analyses of actually measured data of a large quantity of users, during normal use, each user performs a screen-on operation once every more than 10 minutes on average. Therefore, an effective scope of a network disconnection function for over 30 minutes or over one hour is limited, and the function is effective only when a mobile phone is not used for a long time, for example, during sleep at night. If a data service is disabled as soon as the screen of the terminal is off, to reduce the power consumption, a service running on the terminal is affected. For example, a user is chatting with a friend by using WeChat. When the screen is off after a message is sent, if the terminal directly disables a data service in this case, the user cannot receive a reply message of the friend in a timely manner. Apparently, user experience is affected. Therefore, for the foregoing case, the terminal needs to be further optimized to reduce the standby power consumption.

Figure 3:
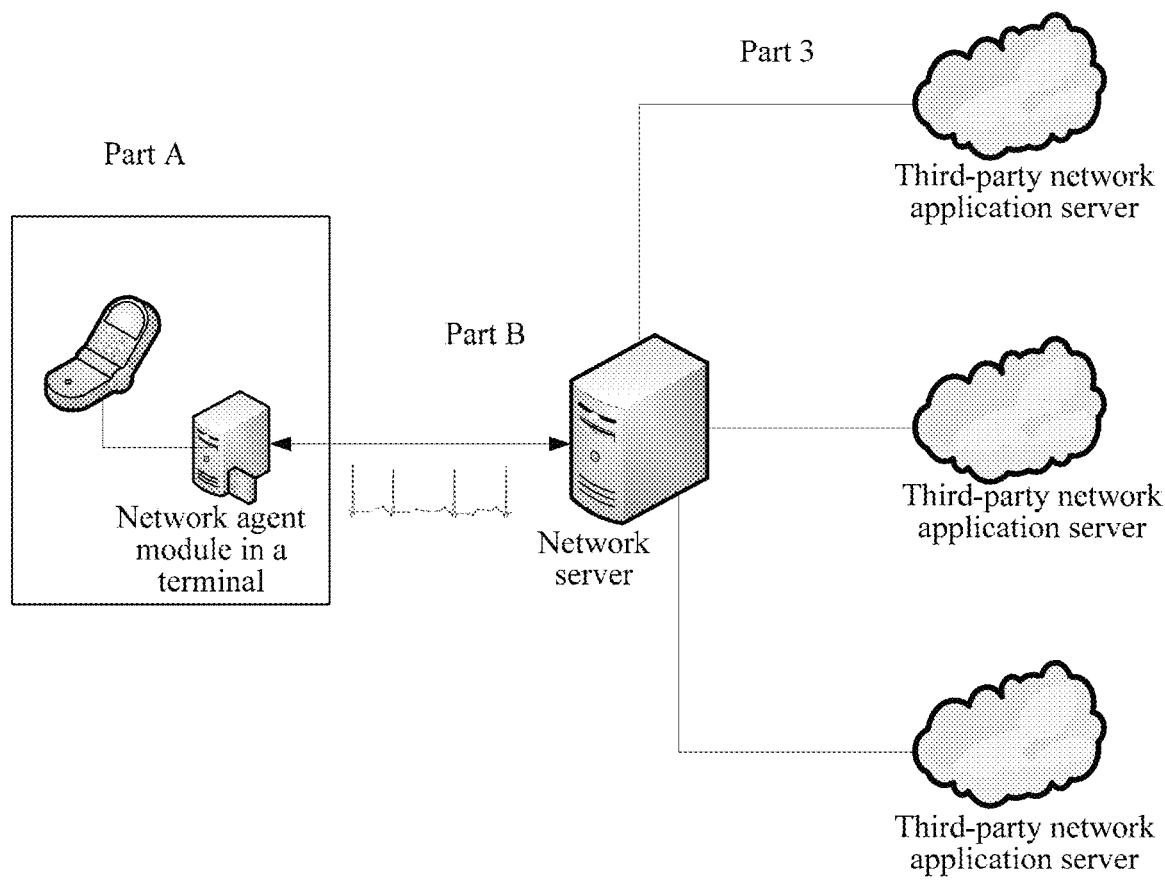
FIG. 3 is an architectural networking diagram according to an embodiment of the present invention.

An embodiment of the present invention provides some solutions to resolve the foregoing problem. A mobile phone is used as an example. A networking architecture in this embodiment of the present invention is shown in FIG. 3.

The networking architecture includes a terminal and a network device. A part A is the terminal, and a part B and a part C is the network device. The part B is optional.

Part A: A network agent related to network access may be established in the terminal, and all data exchanged between the terminal and the network device is received and sent by the network agent.

Part B: This is an optional part. The network device may include a network server of a terminal equipment vendor. A communications link is established between the network agent in the terminal and the network server of the terminal equipment vendor. Interaction between the terminal and the network server is processed according to a unified heartbeat interval. All network requests of application programs in the terminal are forwarded by the network server to corresponding application servers. The network server of the terminal equipment vendor performs unified management on interaction between the terminal and a network. Provided that it is ensured that the link is unblocked during heartbeat running, the application programs in the terminal and the corresponding servers corresponding to the application programs are all online.

Part C: The network device includes a third-party application server. The third-party application server is an application server corresponding to an application program running on the terminal. The network server of the terminal equipment vendor may interact with the third-party application server, and serve as an agent of all terminal devices. It should be understood that, the application program in this embodiment of the present invention does not include a local application program, that is, does not include an application program that does not interact with the third-party application server.

If the network device does not include the network server of the terminal equipment vendor, the network agent in the terminal may separately send heartbeats of currently running application programs to the third-party application server when a unified heartbeat arrives. It may be understood that, when the terminal sends a heartbeat or another interaction message to the network server of the terminal equipment vendor or the third-party application server, some other devices such as a base station and a WiFi device in the network may be used. All of the content can be understood by a person skilled in the art, and details are not described in this embodiment of the present invention.

Optionally, the network agent in the terminal may be a timing management service unit, and the timing management service unit may set a timer according to an indication. A unified heartbeat interval may be set for the terminal by using the timing management service unit, and when it is notified that the unified heartbeat interval arrives, the terminal is woken up at a time indicated by the timer, to send a heartbeat to an application server corresponding to an online application program in the terminal.

Figure 4:
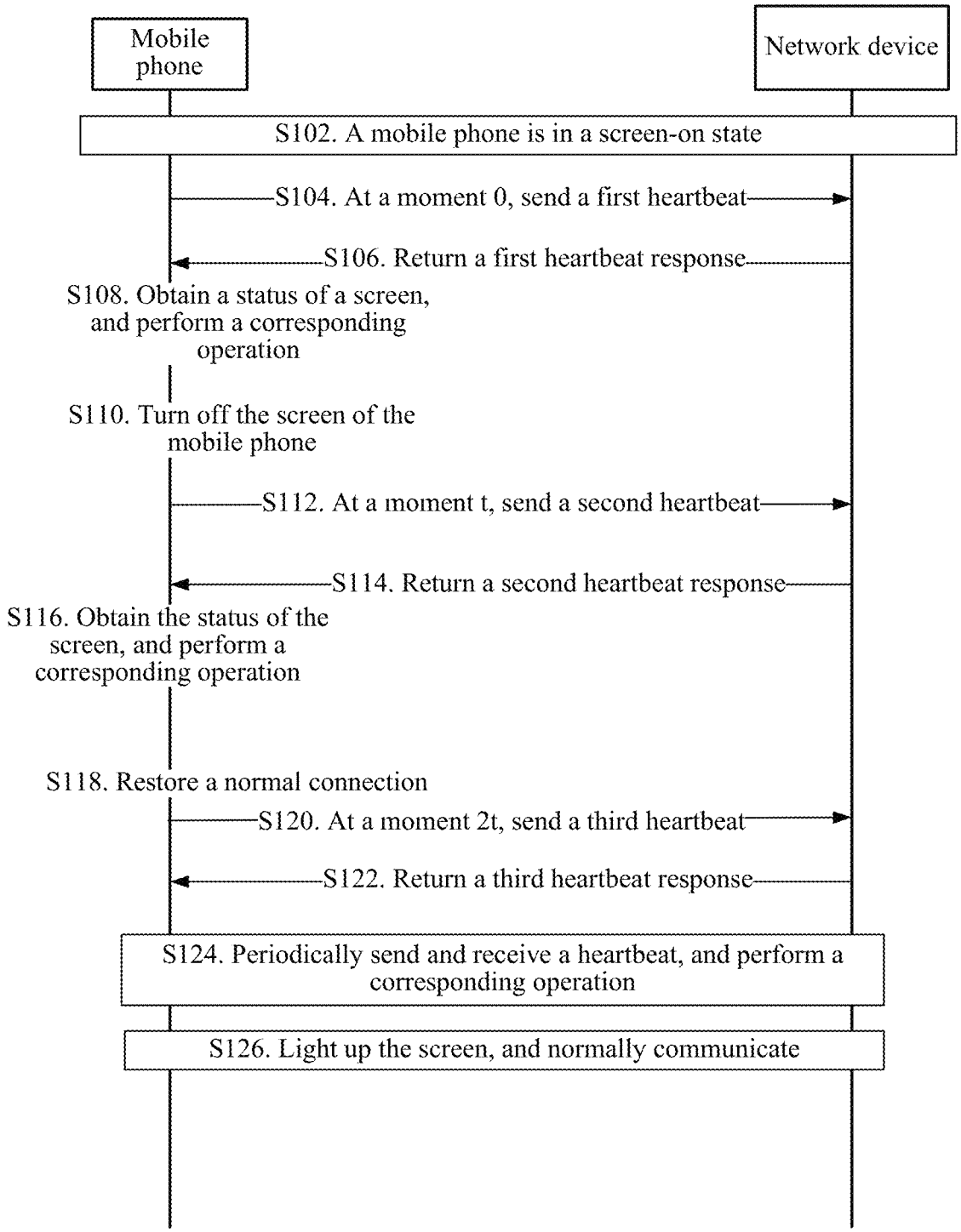
FIG. 4 is a schematic flowchart of a method for interaction between a terminal and a network device according to Embodiment 1 of the present invention.

Embodiment 1 of the present invention discloses a method for interaction between a terminal and a network device, so that standby power consumption can be reduced when a user is unaware, a running application program remains not suspended and disabled, and a heartbeat does not stop. The following describes a specific implementation process of the solution by using an example in which a terminal is a mobile phone, as shown in FIG. 4.

S102. The mobile phone is in a screen-on state.

For example, a screen of the mobile phone is in an on state, a user is chatting with a friend by using WeChat, and the mobile phone normally communicates with a network device. In addition, application programs running on the mobile phone further include Facebook and Sina Weibo.

Optionally, a network agent may be included in the mobile phone. The network agent in the mobile phone manages all network sessions on a mobile phone side that are exchanged between the mobile phone and the network device. For example, data sent by an application program running on the mobile phone to the network device is all sent by using the network agent, and data received by the mobile phone is all sent to a corresponding application program by using the network device.

Optionally, the network device may include a network server of a terminal equipment vendor. The mobile phone interacts with a third-party server by using the network server of the terminal equipment vendor. Herein, the terminal equipment vendor is a manufacturer of the mobile phone. For example, if the mobile phone used by the user is Huawei mate 7, the server of the terminal equipment vendor is a Huawei server; if the mobile phone used by the user is iPhone 6, the server of the terminal equipment vendor is an Apple server, and so on. The third-party server refers to a server corresponding to an application program, such as a WeChat server, a Facebook server, or a Sina server.

S104. At a moment 0, the mobile phone sends a first heartbeat to a network device.

For example, the first heartbeat includes a heartbeat sent by each of three application programs running on the mobile phone to an application server corresponding to each of the three application programs, for example, a heartbeat sent by WeChat to the WeChat server, a heartbeat sent by Facebook to the Facebook server, and a heartbeat sent by Sina Weibo to the Sina server. If the network device does not include the network server of the terminal equipment vendor, the mobile phone separately sends, at the moment 0, a heartbeat to the application server corresponding to each application program. If the network device includes the network server of the terminal equipment vendor, the mobile phone sends heartbeats to the network server of the terminal equipment vendor. The network server of the terminal equipment vendor separately forwards the received heartbeats to corresponding third-party servers, that is, the WeChat server, the Facebook server, and the Sina server. The mobile phone sends a heartbeat to a third-party server at a unified heartbeat interval t. That the mobile phone sends a heartbeat to the network server of the terminal equipment vendor may be that the mobile phone combines heartbeats of all running application programs for sending, or may be that the mobile phone separately sends heartbeats of all running application programs to the network server of the terminal equipment vendor. The first heartbeat is a collective term for heartbeats sent by currently running application programs to corresponding application servers, so that the application servers know that the application servers are "online".

Application programs running on the terminal may include an application program running in the foreground and an application program running in the background. The application program running in the foreground refers to an application program that is running in a window and whose running interface can directly interact with the user. The application program running in the background refers to an application program that is running on a resource manager and that does not have an interface or whose interface cannot directly interact with the user but that occupies a system resource. After the screen of the terminal is off, all running application programs may be considered as background application programs or background applications.

S106. After receiving the first heartbeat, the network device returns a first heartbeat response to the mobile phone.

For example, after receiving first heartbeats, the WeChat server, the Facebook server, and the Sina server return first heartbeat responses to the mobile phone. If the network device does not include the network server of the terminal equipment vendor, the application server corresponding to each application program in the mobile phone separately sends a first heartbeat response to the mobile phone. If the network device includes the network server of the terminal equipment vendor, the application servers corresponding to all the application programs, that is, the WeChat server, the Facebook server, and the Sina server, separately send first heartbeat responses to the network server of the terminal equipment vendor, and then, the network server of the terminal equipment vendor forwards the received first heartbeat responses to the mobile phone. First heartbeat responses received by the mobile phone include the first heartbeat responses of the three application programs running on the mobile phone, that is, WeChat, Facebook, and Sina Weibo. The network server of the terminal equipment vendor may combine the first heartbeat responses of the three application programs, and send a heartbeat response obtained by means of combination to the mobile phone, and then, the network agent of the mobile phone separately forwards the heartbeat responses to the corresponding application programs. Alternatively, the network server of the terminal equipment vendor may separately send the received first heartbeat responses of the three application programs to the mobile phone.

S108. Obtain a status of a screen of the mobile phone, and perform a corresponding operation.

For example, after receiving the first heartbeat response, the mobile phone immediately obtains the status of the screen of the mobile phone. Alternatively, after receiving the first heartbeat response, the mobile phone may obtain the status of the screen of the mobile phone after a predetermined time. When the screen of the mobile phone is in an on state, the mobile phone normally interacts with the network device, and does not perform other processing.

S110. Turn off the screen of the mobile phone.

For example, after sending a message to a friend by using WeChat, the user presses a button to turn off the screen. In this case, only the screen of the mobile phone is in an off state, but the mobile phone is not powered off. All application programs running on the mobile phone may be considered as background applications.

S112. At a moment t, the mobile phone sends a second heartbeat to the network device.

For example, the heartbeat is a unified heartbeat of all application programs running on the mobile phone, for example, WeChat, Facebook, and Sina Weibo. It may be understood that, if the application programs that are running on the mobile phone when the first heartbeat is sent in S104 are the same as the application programs that are running when the second heartbeat is sent in S112, the unified heartbeat interval at which the mobile phone sends a heartbeat may not change. If after S104, the user enables another application program or disables some application programs, the unified heartbeat interval at which the mobile phone sends a heartbeat may vary according to different running application programs. A manner in which the mobile phone sends the second heartbeat to the network device is the same as a manner of sending the first heartbeat. Details are not described herein again.

S114. After receiving the second heartbeat, the network device returns a second heartbeat response to the mobile phone.

For example, after receiving second heartbeats, the WeChat server, the Facebook server, and the Sina server return second heartbeat responses to the mobile phone. A manner in which the WeChat server, the Facebook server, and the Sina server send the second heartbeat responses to the mobile phone is the same as a manner of sending the first heartbeat responses. Details are not described herein again.

S116. Obtain the status of the screen of the mobile phone, and perform a corresponding operation.

For example, after the mobile phone receives the second heartbeat response, if the screen of the mobile phone is in an off state, and duration of the off state is not greater than T1, the mobile phone releases network link resources of a connection between the mobile phone and the network device. After the mobile phone releases the network link resources, a modem is in an idle state (Idle State), and does not interact with an air interface any longer. Therefore, the mobile phone cannot exchange data with the network device. Optionally, the mobile phone may release the network link resources by using a radio resource control (Radio Resource Control, RRC) release interface such as an RRC release interface.

If the screen of the mobile phone is in an off state, and duration of the off state is greater than T1 and not greater than T2, where T2>T1>0, a background application of the mobile phone is prohibited from accessing the network device. When the background application of the mobile phone is prohibited from accessing the network device, the mobile phone and the network device may remain connected. However, alternatively, if a time during which the mobile phone does not interact with the network device exceeds a threshold, the mobile phone may release network link resources.

Optionally, the mobile phone may prohibit some application programs from accessing the network device. For example, the mobile phone may allow a specific proportion of application programs to access a network, and prohibit other application programs from accessing the network. Alternatively, the mobile phone may prohibit some preset application programs from accessing a network, or the mobile phone may prohibit some application programs that frequently interact with a network or that exchange a large amount of data with a network from accessing the network. By determining, through statistics, whether a quantity of interaction times or a size of interaction traffic exceeds a corresponding threshold, the mobile phone may determine whether the application program frequently interacts with the network or exchanges a relatively large amount of data with the network.

If the screen of the mobile phone is in an off state, and duration of the off state is greater than T2, a data service of the terminal is disabled.

Optionally, if the screen of the mobile phone is in an off state and the duration of the off state is not greater than T1 when the mobile phone receives the second heartbeat response, the network link resources of the connection between the mobile phone and the network device are released. If the duration of the off state of the screen of the mobile phone reaches T1 before a next unified heartbeat interval arrives, the background application of the mobile phone is prohibited from accessing the network device; or if the duration of the off state of the screen of the mobile phone reaches T2 before a next unified heartbeat interval arrives, the data service of the mobile phone is disabled.

S118. Before a unified heartbeat interval arrives, the mobile phone restores a normal connection to the network device.

For example, if the network link resources of the mobile phone and the network device are released, the mobile phone restores the network link resources of the connection to the network device. The mobile phone establishes a connection to the network device again, and the modem is switched from the idle state to a running state.

It may be understood that, the network link resources may be completely the same as or may be not completely the same as network link resources existing when the first heartbeat is sent. For example, time frequency resources allocated on a network side may be different. However, in another aspect such as a network protocol, there is no substantial difference between the network link resources established in this step and the network link resources existing when the first heartbeat is sent. It may be considered that, the network link resources established in this step are the same as the network link resources existing when the first heartbeat is sent.

If the background application of the mobile phone is prohibited from accessing the network device, the mobile phone allows the background application to access the network device.

If the data service of the mobile phone is disabled, the data service of the mobile phone is enabled.

For example, if the screen of the mobile phone is in an off state and the duration of the off state is less than T1 after the mobile phone receives the first heartbeat response, and the duration of the off state is greater than T1 and less than T2 before the current unified heartbeat interval of the mobile phone arrives, the mobile phone restores the network link resources of the connection to the network device, and allows the background application of the mobile phone to access the network device.

S120. At a moment 2t, the mobile phone sends a third heartbeat to the network device.

For example, the heartbeat is a unified heartbeat of all application programs running on the mobile phone, for example, WeChat, Facebook, and Sina Weibo. A manner in which the mobile phone sends the third heartbeat to the network device is the same as manners of sending the first and second heartbeats. Details are not described herein again.

S122. After receiving the third heartbeat, the network device returns a third heartbeat response to the mobile phone.

For example, after receiving third heartbeats, the WeChat server, the Facebook server, and the Sina server return third heartbeat responses to the mobile phone. A manner in which the WeChat server, the Facebook server, and the Sina server send the third heartbeat responses to the mobile phone is the same as manners of sending the first and second heartbeat responses. Details are not described herein again.

S124. The mobile phone periodically sends and receives a heartbeat at a unified heartbeat interval t, and obtains the status of the screen of the mobile phone to perform a corresponding operation.

For example, before the screen of the mobile phone is lighted up, at the unified heartbeat interval t, the mobile phone sends a heartbeat to the network device and receives a heartbeat response returned by the network device, and the mobile phone determines duration of an off state of the screen of the mobile phone each time the mobile phone receives the heartbeat response, to perform a corresponding operation. Refer to S116. Details are not described herein again.

S126. A user lights up the screen of the mobile phone, and the mobile phone normally communicates with the network device.

For example, after the user operates the mobile phone, and lights up the screen of the mobile phone, the mobile phone normally interacts with the network device. That is, after the mobile phone receives a heartbeat response, when learning that the screen of the mobile phone is in an on state, the mobile phone does not perform other processing, and keeps a normal connection to the network device. It should be understood that, in this embodiment, that the mobile phone does not perform other processing is that the mobile phone does not perform processing other than normal interaction with the network device, for example, processing related to releasing the network link resources of the connection between the terminal and the network device, and/or prohibiting the background application of the terminal from accessing the network device, and/or disabling the data service of the terminal in S116.

Optionally, the mobile phone may start one timekeeper/timer or multiple timekeepers/timers to perform timekeeping. For the heartbeat interval t, and the duration T1 and T2 of the off state of the screen of the mobile phone, one timekeeper may be started to perform timekeeping, or two or three timekeepers may be started to perform timekeeping, or more timekeepers may be started to perform timekeeping. This is not limited in the present invention.

Optionally, after the mobile phone receives a heartbeat response, if the screen of the mobile phone is in an off state, and duration of the off state is not greater than T1, the mobile phone releases network link resources of a connection between the mobile phone and the network device. Before a next heartbeat interval arrives, the mobile phone may continue to determine whether the duration of the off state of the screen is greater than T1. If the duration of the off state of the mobile phone reaches T1, a background application of the mobile phone is prohibited from accessing the network device. If the duration of the off state of the mobile phone reaches T2, a data service of the mobile phone is disabled. The mobile phone may set a timekeeper, so that when the duration of the off state of the mobile phone reaches T1, the mobile phone may be triggered to prohibit the background application from accessing the network device. The mobile phone may set a timekeeper, so that when the duration of the off state of the screen of the mobile phone reaches T2, the mobile phone may be triggered to disable the data service of the mobile phone. Alternatively, before a next heartbeat interval arrives, the mobile phone may not continue to determine the duration of the off state of the screen. For example, after the mobile phone receives the heartbeat response, if the duration of the off state of the screen of the mobile phone is not greater than T1, the mobile phone releases the network link resources of the connection between the mobile phone and the network device, and then, does not determine, before the next heartbeat interval arrives, whether the duration of the off state of the screen is greater than T1 or T2.

Optionally, in another optional implementation manner of S116, after the mobile phone receives a heartbeat response, if the screen of the mobile phone is in an off state, and if duration of the off state is not greater than T1, the mobile phone releases network link resources of a connection between the mobile phone and the network device; or if duration of the off state is not greater than T2, the mobile phone disables a data service of the mobile phone; or if duration of the off state is greater than T2, the mobile phone prohibits a background application of the mobile phone from accessing the network device.

Optionally, in another optional implementation manner of S116, after the mobile phone receives a heartbeat response, if the screen of the mobile phone is in an off state, and if duration of the off state is not greater than T1, the mobile phone prohibits a background application of the mobile phone from accessing the network device; or if duration of the off state is greater than T1 and not greater than T2, the mobile phone releases network link resources of a connection between the mobile phone and the network device; or if duration of the off state is greater than T2, the mobile phone disables a data service of the mobile phone.

Optionally, in another optional implementation manner of S116, after the mobile phone receives a heartbeat response, if the screen of the mobile phone is in an off state, and if duration of the off state is not greater than T1, the mobile phone prohibits a background application of the mobile phone from accessing the network device; or if duration of the off state is greater than T1 and not greater than T2, the mobile phone disables a data service of the mobile phone; or if duration of the off state is greater than T2, the mobile phone releases network link resources of a connection between the mobile phone and the network device.

Optionally, in another optional implementation manner of S116, after the mobile phone receives a heartbeat response, if the screen of the mobile phone is in an off state, and if duration of the off state is not greater than T1, the mobile phone disables a data service of the mobile phone; or if duration of the off state is greater than T1 and not greater than T2, the mobile phone prohibits a background application of the mobile phone from accessing the network device; or if duration of the off state is greater than T2, the mobile phone releases network link resources of a connection between the mobile phone and the network device.

Optionally, in another optional implementation manner of S116, after the mobile phone receives a heartbeat response, if the screen of the mobile phone is in an off state, and if duration of the off state is not greater than T1, the mobile phone disables a data service of the mobile phone; or if duration of the off state is greater than T1 and not greater than T2, the mobile phone releases network link resources of a connection between the mobile phone and the network device; or if duration of the off state is greater than T2, the mobile phone prohibits a background application of the mobile phone from accessing the network device.

Optionally, after the mobile phone receives a heartbeat response, if the screen of the mobile phone is in an off state, the mobile phone may use only a single policy, and does not need to determine duration of the off state of the screen of the mobile phone. For example, if the screen of the mobile phone is in an off state, the mobile phone releases network link resources; or if the screen of the mobile phone is in an off state, the mobile phone prohibits a background application from accessing the network device; or if the screen of the mobile phone is in an off state, the mobile phone disables a data service.

In this embodiment of the present invention, after a terminal receives a heartbeat response, if a screen is in an off state, and optionally, the off state lasts for a preset period of time, the terminal may release network link resources of a connection between the terminal and the network device, and/or prohibit a background application of the terminal from accessing the network device, and/or disable a data service of the terminal, and restore a status of network connection to a normal connection state before sending a heartbeat again. In this way, when the screen is off between two heartbeats, and optionally, the off state lasts for a preset period of time, data exchange between an application program and the network device is interrupted, so that power consumption of the terminal can be effectively reduced when both the terminal and an application server to which the application program belongs are online and a user is unaware.

Embodiment 2

This embodiment is an experiment performed on the basis of Embodiment 1, and a mobile phone in the 3G standard is used as an example of a terminal in this embodiment. The terminal releases network link resources by using t as an interval, and enables a modem to enter a sleep state, and t is a unified heartbeat interval of the terminal. In this embodiment, the mobile phone releases the network link resources by using a radio resource control (Radio Resource Control, RRC) release interface.

Some daily applications, for example, WeChat, QQ, Netease News, Zarek, and Dianping, are installed and run on the mobile phone in the 3G standard in this embodiment. In this embodiment of the present invention, only examples are listed. The mobile phone may first obtain, by means of calculation, a unified heartbeat of a currently running application program. There are multiple implementation manners of calculating the unified heartbeat. This is not limited in this embodiment of the present invention. The unified heartbeat of the mobile phone may be preset empirically or by using another condition.

Figure 5:
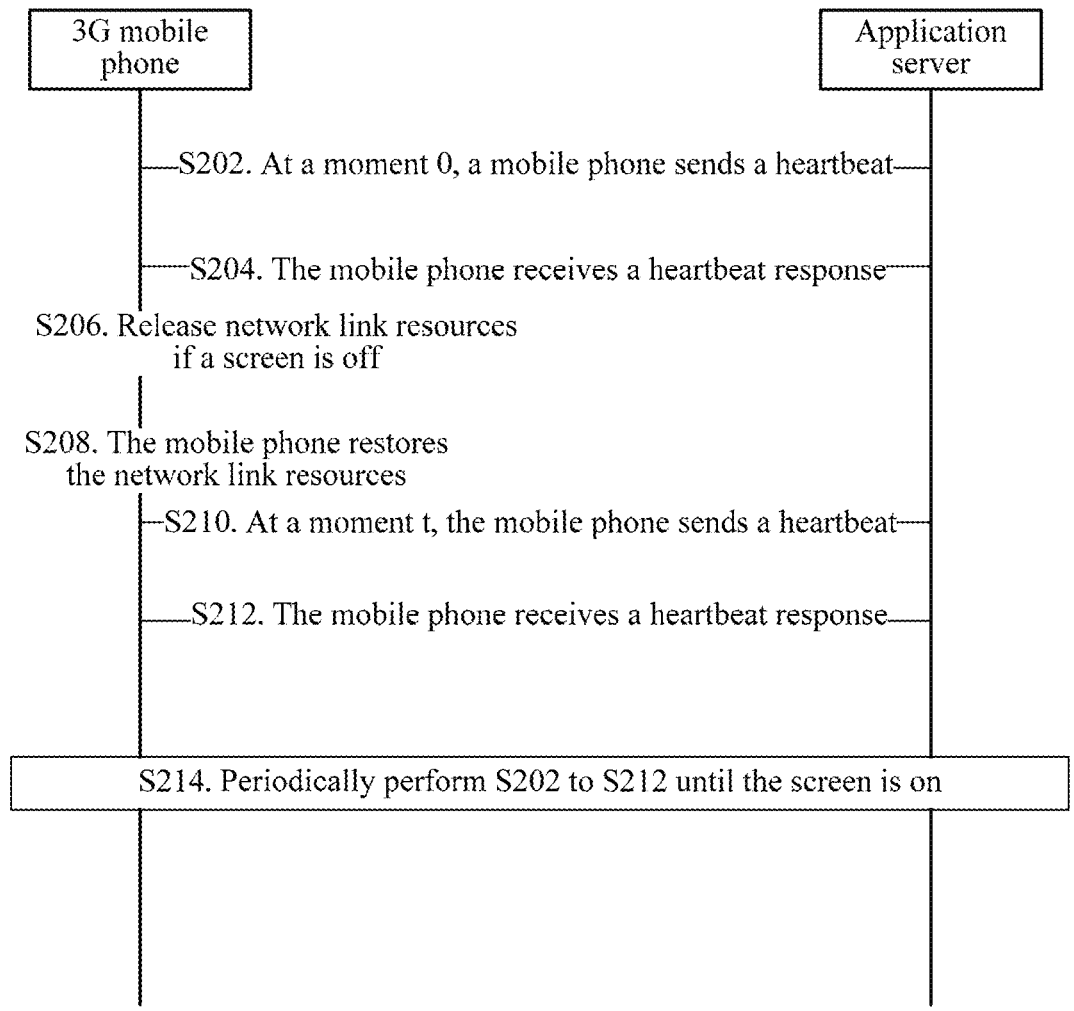
FIG. 5 is a schematic flowchart of a method according to Embodiment 2 of the present invention.
Figure 6:
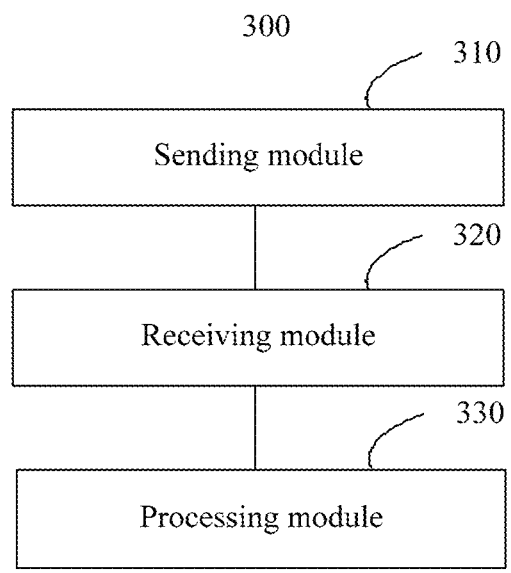
FIG. 6 is a schematic diagram of an apparatus structure of a terminal according to Embodiment 3 of the present invention.

As shown in FIG. 5, this embodiment may include the following steps.

S202. At a moment 0, the mobile phone sends a heartbeat.

The mobile phone communicates with a network device by using a 3G network. Application programs that are running on the mobile phone separately send heartbeats to application servers corresponding to the application programs. It may be understood that, another network device in the 3G network, for example, a base station, that may be used when the mobile phone sends a heartbeat to an application server is content well-known by a person skilled in the art, and details are not described herein.

S204. The mobile phone receives a heartbeat response.

The mobile phone receives heartbeat responses returned by the application servers. After receiving the heartbeats, the application servers separately return the heartbeat responses to the mobile phone.

S206. The mobile phone releases network link resources if a screen of the mobile phone is in an off state.

After receiving the heartbeat responses, the mobile phone obtains a status of the screen of the mobile phone. If the screen of the mobile phone is in an off state, the RRC release interface is used to release network link resources of a connection between the mobile phone and the network, so that the modem is in an idle state.

S208. The mobile phone restores the network link resources.

When a unified heartbeat interval is about to arrive, the mobile phone restores the network link resources, so that the mobile phone is normally connected to the network. The modem is switched from the idle state to a running state, and establishes a connection to the network device again.

S210. At a moment t, the mobile phone sends a heartbeat.

When the unified heartbeat interval arrives, the mobile phone sends heartbeats to application servers corresponding to currently running application programs.

S212. The mobile phone receives a heartbeat response.

The mobile phone receives heartbeat responses returned by the application servers. After receiving the heartbeats, the application servers separately return the heartbeat responses to the mobile phone.

S214. Periodically perform S202 to S212 until the screen of the mobile phone is in an on state.

In other words, the mobile phone periodically sends, at a unified heartbeat interval t, a heartbeat to an application server corresponding to an application program running on the mobile phone, and receives a heartbeat response. Each time the mobile phone receives the heartbeat response, the mobile phone releases the network link resources and is disconnected from the network, and before a next heartbeat interval arrives, the mobile phone restores the network link resources and establishes a connection to the network again, until a user lights up the screen of the mobile phone.

In the actual measurement experiment in this embodiment, an average current of the mobile phone for three hours is 15.351 mA with use of the foregoing method, and is 7 mA less than an average current 22.268 mA for three hours without use of the foregoing method, and gains reach 31.1%. In the method in this embodiment, power consumption can be reduced and a standby time of a mobile phone can be prolonged when a user is unaware and an application program heartbeat is kept.

In this embodiment of the present invention, after a terminal receives a first heartbeat response, if it is determined that a screen is in an off state, the terminal interrupts, by releasing network link resources, data exchange between an application program in the terminal and a network device, and restores the network link resources before sending a second heartbeat, so that power consumption of the terminal can be effectively reduced when both the terminal and an application server to which the application program belongs are online and a user is unaware.

Embodiment 3

Figure 7:
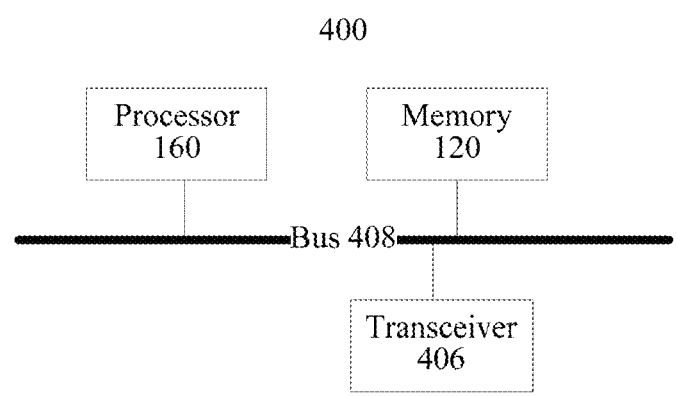
FIG. 7 is a schematic diagram of a hardware structure of a terminal according to Embodiment 4 of the present invention.

Embodiment 3 of the present invention provides a terminal 300. A structural diagram of the terminal 300 is shown in FIG. 7, and the terminal 300 is configured to execute the methods in Embodiment 1 and Embodiment 2. All solutions and features that can be implemented in Embodiment 1 and Embodiment 2 are applicable to this embodiment, and details are not described herein again.

The terminal 300 includes a sending module 310, a receiving module 320, and a processing module 330. It may be understood that, the sending module 310 and the receiving module 320 may also be integrated into a transceiver module.

In an implementation manner, the sending module is configured to send a first heartbeat to a network device;

the receiving module is configured to receive a first heartbeat response returned by the network device, where the first heartbeat response is a response corresponding to the first heartbeat;

the processing module is configured to: after the receiving module receives the first heartbeat response, if a screen of the terminal is in an off state, and if duration of the off state is not greater than T1, release network link resources of a connection between the terminal and the network device; or if duration of the off state is greater than T1 and not greater than T2, where T2>T1>0, prohibit a background application of the terminal from accessing the network device; or if duration of the off state is greater than T2, disable a data service of the terminal;

before the sending module sends a second heartbeat to the network device, the processing module is further configured to execute the following:

if the network link resources of the connection between the terminal and the network device are released, restoring the network link resources; or if the background application of the terminal is prohibited from accessing the network device, allowing the background application of the terminal to access the network device; or if the data service of the terminal is disabled, enabling the data service of the terminal;

the sending module is further configured to send the second heartbeat to the network device; and the receiving module is further configured to receive a second heartbeat response returned by the network device, where the second heartbeat response is a response corresponding to the second heartbeat.

Optionally, N application programs run on the processing module, N is an integer, N is greater than 1, and the first heartbeat includes a heartbeat sent by each of the N application programs to an application server corresponding to each of the N application programs.

Optionally, the terminal may further include a network agent module. The network agent module may also be integrated into the processing module 330. The N application programs send heartbeats to the network device by using the network agent in the terminal.

Optionally, the network device includes a network server of a terminal equipment vendor corresponding to the terminal. That the sending module sends the first heartbeat to the network device may be that the sending module sends the first heartbeat to the network server, and then, the network server forwards the first heartbeat to application servers corresponding to the N application programs.

In another implementation manner, the processing module 330 is configured to: after the receiving module 320 receives the first heartbeat response, if a screen of the terminal is in an off state, release network link resources of a connection between the terminal and the network device; and before the sending module 310 sends a second heartbeat to the network device, the processing module 330 is further configured to restore the network link resources.

In another implementation manner, the processing module 330 is configured to: after the receiving module 320 receives the first heartbeat response, if a screen of the terminal is in an off state, prohibit a background application of the terminal from accessing the network device; and before the sending module 310 sends a second heartbeat to the network device, the processing module 330 is further configured to allow the background application of the terminal to access the network device.

In another implementation manner, the processing module 330 is configured to: after the receiving module 310 receives the first heartbeat response, if a screen of the terminal is in an off state, disable a data service of the terminal; and before the sending module 320 sends a second heartbeat to the network device, the processing module 330 is further configured to enable the data service of the terminal.

The terminal 300 in this embodiment may be further configured to implement another implementation manner in Embodiment 1 or Embodiment 2. For concise description, details are not described herein again.

In this embodiment of the present invention, after a terminal receives a heartbeat response, if a screen is in an off state, the terminal releases network link resources of a connection between the terminal and the network device/prohibits a background application of the terminal from accessing the network device/disables a data service of the terminal, and restores a status of the network connection to a normal connection state before sending a heartbeat again. In this way, when the screen is off between two heartbeats, data exchange between an application program and the network device is interrupted, so that power consumption of the terminal can be effectively reduced when both the terminal and an application server to which the application program belongs are online and a user is unaware.

Embodiment 4 of the present invention further provides a terminal 400. A schematic diagram of a hardware structure of the terminal 400 is shown in FIG. 5. The terminal 400 is configured to execute the methods in Embodiment 1 and Embodiment 2. All solutions and features that can be implemented in Embodiment 1 and Embodiment 2 are applicable to this embodiment, and details are not described herein again.

The terminal 400 includes a processor 160, a memory 120, a transceiver 406, and a bus 408. The processor 160, the memory 120, and the transceiver 406 communicate with each other by using the bus 408. It may be understood that, although the processor 160 and the memory 120 in the terminal that are shown in FIG. 5 are the same as the processor 160 and the memory 120 in FIG. 1, the terminal 400 in this embodiment is not limited to a mobile phone, and structures of the processor, the memory, and the like in the terminal 400 may be related to the structure of the mobile phone 100 but be not limited by the structure of the mobile phone. It may be understood that, the terminal may further include a screen, configured to display information, for example, the display unit 140 in FIG. 1, or may include only the display panel 141.

The processor 160 includes an application processor (Application Processor, AP) and a communication processor (Communication Processor, CP). The application processor mainly processes an operating system, a user interface, an application program, and the like. The communication processor may also be referred to as a baseband processor (Baseband Processor, BP), and mainly processes wireless communication. The transceiver 406 may include the RF circuit 110 and/or the WiFi module 180 in FIG. 1. The terminal 400 may communicate with a network device by using the transceiver 406. The transceiver 406 may send data to the network device, and receive data from the network device. For a structure of the terminal 400, refer to FIG. 1 and specific descriptions of components of the mobile phone 100, and details are not described herein again.

The processor 160 may include a network agent. All data exchanged between the terminal and the network device is received and sent by the network agent. Specifically, the network agent may be a software module of the processor 160. Optionally, the network agent may be a software module in the AP.

Specifically, in an implementation manner, the processor 160 may be configured to send a first heartbeat to the network device. It may be understood that, the processor 160 sends, to the transceiver 406, the first heartbeat that is to be sent to the network device, and then, the transceiver sends the first heartbeat to the network device. When N application programs run on the processor 160, the first heartbeat includes a heartbeat sent by each of the N application programs to an application server corresponding to each of the N application programs. N is a positive integer. If the network device does not include a network server of a terminal equipment vendor, the processor 160 separately sends a heartbeat to the application server corresponding to each application program. If the network device includes a network server of a terminal equipment vendor, the processor 160 sends a heartbeat to the network server of the terminal equipment vendor. The network server of the terminal equipment vendor separately forwards received heartbeats to corresponding application servers.

The processor 160 is further configured to receive a first heartbeat response returned by the network device. Likewise, the first heartbeat response received by the processor is received by the transceiver 406 from the network device. The first heartbeat response is a heartbeat response returned by the application server corresponding to each of the N application programs. If the network device does not include the network server of the terminal equipment vendor, the application server corresponding to each application program separately sends a first heartbeat response to the terminal. If the network device includes the network server of the terminal equipment vendor, the application servers corresponding to all the application programs separately send first heartbeat responses to the network server of the terminal equipment vendor, and then, the network server of the terminal equipment vendor forwards the received first heartbeat responses to the terminal.

The processor 160 is further configured to: after receiving the first heartbeat response, obtain a status of the screen, and if the screen of the terminal is in an off state, and if duration of the off state is not greater than T1, release network link resources of a connection between the terminal and the network device; or if duration of the off state is greater than T1 and not greater than T2, where T2>T1>0, prohibit a background application of the terminal from accessing the network device; or if duration of the off state is greater than T2, disable a data service of the terminal.

Before sending a second heartbeat to the network device, the processor 160 is further configured to execute the following:

if the network link resources of the network agent and the network device are released, restoring the network link resources; or if the background application of the terminal is prohibited from accessing the network device, allowing the background application of the terminal to access the network device; or if the data service of the terminal is disabled, enabling the data service of the terminal.

The processor 160 may be further configured to send the second heartbeat to the network device. A manner of sending the second heartbeat is the same as a manner of sending the first heartbeat, and details are not described herein again.

The processor 160 is further configured to receive a second heartbeat response. A manner of receiving the second heartbeat is the same as a manner of receiving the first heartbeat, and details are not described herein again.

Optionally, in another optional implementation manner, the processor 160 obtains a status of the screen after receiving the first heartbeat response, and if the screen of the terminal is in an off state, the processor 160 may release network link resources of a connection between the terminal and the network device; or the processor 160 may prohibit a background application of the terminal from accessing the network device; or the processor 160 may disable a data service of the terminal. In this implementation manner, the processor may not need to obtain duration of the off state of the screen.

Before sending a second heartbeat to the network device, the processor 160 is further configured to execute the following:

if the network link resources of the network agent and the network device are released, restoring the network link resources; or if the background application of the terminal is prohibited from accessing the network device, allowing the background application of the terminal to access the network device; or if the data service of the terminal is disabled, enabling the data service of the terminal.

The terminal 400 may be further configured as a terminal for implementing another implementation manner. For details, refer to the optional implementation manners in Embodiment 1, and details are not described herein again.

In the solution provided in this embodiment, after a terminal receives a heartbeat response, if a screen is in an off state, the terminal releases network link resources of a connection between the terminal and the network device/ prohibits a background application of the terminal from accessing the network device/disables a data service of the terminal, and restores a status of network connection to a normal connection state before sending a heartbeat again. In this way, when the screen is off between two heartbeats, data exchange between an application program and the network device is interrupted, so that power consumption of the terminal can be effectively reduced when both the terminal and an application server to which the application program belongs are online and a user is unaware.

It should be understood that, in all the embodiments in the specification, as shown in FIG. 7, the terminal generally includes at least one processor (such as a CPU), at least one transceiver, and at least one bus. The processor is a control center of an electronic device, is connected to parts of the entire electronic device by using various interfaces and lines, and performs various functions and/or data processing of the electronic device by running or executing a software program and/or a module stored in a storage unit and invoking data stored in the storage unit. The processor may include an integrated circuit (Integrated Circuit, IC for short), for example, may include a single packaged IC, or may include multiple connected packaged ICs that have same functions or different functions. For example, the processor may include only a central processing unit (Central Processing Unit, CPU for short), or may be a combination of a GPU, a digital signal processor (Digital Signal Processor, DSP for short), and a control chip (such as a baseband chip) in a communications unit. In an implementation manner of the present invention, the CPU may be a single computing core or may include multiple computing cores.

It should be noted that, although only the processor 160, the memory 120, the transceiver 406, and the bus 408 are shown for the terminal 400 shown in FIG. 7, in a specific implementation process, a person skilled in the art should understand that, the terminal 400 further includes another component that is necessary for normal running. In addition, according to a specific requirement, a person skilled in the art should understand that, the terminal 400 may further include a hardware component for implementing another additional function. In addition, a person skilled in the art should understand that, the terminal 400 may include only a component necessary for implementing the embodiments of the present invention, and does not need to include all components shown in FIG. 7.

The hardware structure shown in FIG. 7 and the foregoing description are applicable to various terminals provided in the embodiments of the present invention. A person of ordinary skill in the art may understand that all or some of the steps of the foregoing methods may be implemented by a program instructing relevant hardware. The program may be stored in a computer readable storage medium. The storage medium includes a ROM, a RAM, an optical disc, and the like.

A person of ordinary skill in the art may be aware that, in combination with the examples described in the embodiments disclosed in the specification, units and algorithm steps can be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method for interaction between a terminal and a network, wherein the method comprises:

obtaining, by a terminal, a status of a screen of the terminal;

based on the screen of the terminal being in an off state and a duration of the off state being greater than a first preset value disabling, by the terminal, network access for a first third-party application program running on the terminal while network access for a second third-party application program remains enabled; and after the disabling and prior to the screen of the terminal being switched to an on state:

enabling, by the terminal, network access for the first third-party application program;

sending, by the terminal, a heartbeat corresponding to the first third-party application program to the network; and receiving, by the terminal, a heartbeat response returned by the network, wherein the heartbeat response corresponds to the heartbeat.

2. The method according to claim 1, wherein after the disabling and prior to the screen of the terminal being switched to an on state, the method further comprises:

after receiving the heartbeat response, disabling, by the terminal, network access for the first third-party application program.

3. The method according to claim 1, wherein disabling network access for the first third-party application program comprises:
releasing network link resources corresponding to a connection between the first third-party application program and the network.

4. The method according to claim 1, wherein disabling network access for the first third-party application program comprises:
prohibiting the first third-party application program from accessing the network.

5. The method according to claim 1, wherein a message push by the first third-party application program is not allowed while network access for the first third-party application program is disabled.

6. The method according to claim 1, wherein network data synchronization by the first third-party application program is not allowed while network access for the first third-party application program is disabled.

7. The method according to claim 1, wherein the heartbeat is sent to the network via a network agent in the terminal.

8. The method according to claim 1, wherein the network comprises a network server of a terminal equipment vendor corresponding to the terminal;
wherein the heartbeat is sent to the network server; and
wherein the network server is configured to forward the heartbeat to an application server corresponding to the first third-party application program.

9. A terminal, comprising:
a transceiver, configured to communicate with a network;
one or more processors; and
a non-transitory memory having processor-executable instructions stored thereon;
wherein the one or more processors are configured to execute the processor-executable instructions to facilitate:
obtaining a status of a screen of the terminal;
based on the screen of the terminal being in an off state and a duration of the off state being greater than a first preset value, disabling network access for a first third-party application program running on the terminal while network access for a second third-party application program remains enabled; and
after the disabling and prior to the screen of the terminal being switched to an on state:
enabling network access for the first third-party application program;
sending a heartbeat corresponding to the first third-party application program to the network; and
receiving a heartbeat response returned by the network, wherein the heartbeat response corresponds to the heartbeat.

10. The terminal according to claim 9, wherein the one or more processors are further configured to execute the processor-executable instructions to facilitate:
after the disabling and prior to the screen of the terminal being switched to an on state: after receiving the heartbeat response, disabling, by the terminal, network access for the first third-party application program.

11. The terminal according to claim 9, wherein disabling network access for the first third-party application program comprises:
releasing network link resources corresponding to a connection between the first third-party application program and the network.

12. The terminal according to claim 9, wherein disabling network access for the first third-party application program comprises:
prohibiting the first third-party application program from accessing the network.

13. The terminal according to claim 9, wherein disabling network access for the first third-party application program includes a message push by the first third-party application program not being allowed while network access for the first third-party application program is disabled.

14. The terminal according to claim 9, wherein disabling network access for the first third-party application program includes network data synchronization by the first third-party application program not being allowed while network access for the first third-party application program is disabled.

15. The terminal according to claim 9, wherein sending the heartbeat corresponding to the first third-party application program to the network comprises:
sending the heartbeat to the network via a network agent in the terminal.

16. A system, comprising:
a terminal, configured to:
obtain a status of a screen of the terminal;
based on the screen of the terminal being in an off state and a duration of the off state being greater than a first preset value, disable network access for a first third-party application program running on the terminal while network access for a second third-party application program remains enabled; and
after the disabling and prior to the screen of the terminal being switched to an on state: enable network access for the first third-party application program; send a heartbeat corresponding to the first third-party application program to the network; and receive a heartbeat response returned by the network, wherein the heartbeat response corresponds to the heartbeat; and
a network server of a terminal equipment vendor corresponding to the terminal, wherein the network server is configured to:
receive the heartbeat; and
forward the heartbeat to an application server corresponding to the first third-party application program.

* * * * *